June 3, 1930.  G. E. WHITLOCK  1,761,247

TREAD FOR AUTOMOBILE RUNNING BOARDS

Filed June 3, 1929

Inventor
George E. Whitlock
By
Attorney

Patented June 3, 1930

1,761,247

UNITED STATES PATENT OFFICE

GEORGE E. WHITLOCK, OF TOLEDO, OHIO

TREAD FOR AUTOMOBILE RUNNING BOARDS

Application filed June 3, 1929. Serial No. 367,844.

My invention has for its object to provide a tread for running boards of automobiles that may be readily applied and secured in position. The tread used in connection with my invention is made of a flexible, elastic, material that may be spread in sheet form over the upper surface of the running board to produce a cushioned step. The invention particularly provides a means whereby the tread part may be readily attached or secured in position to the running board.

The invention may be contained in treads that vary in their details of construction and, to illustrate a practical application of the invention, I have selected forms of treads containing the invention as examples of various embodiments of my invention and shall describe them hereinafter. The particular treads selected for purposes of illustration are shown in the accompanying drawing.

Figure 1:
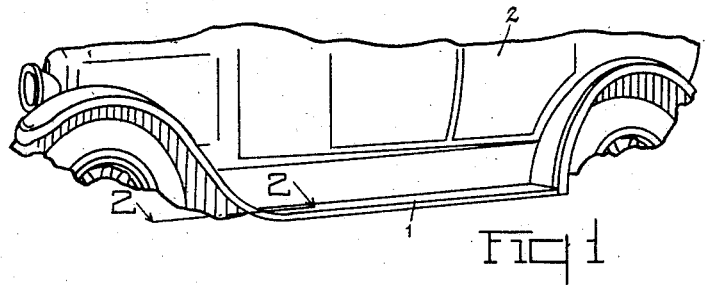
Figure 2:
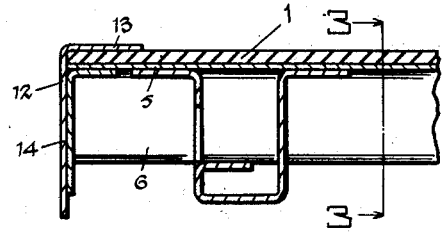
Figure 3:
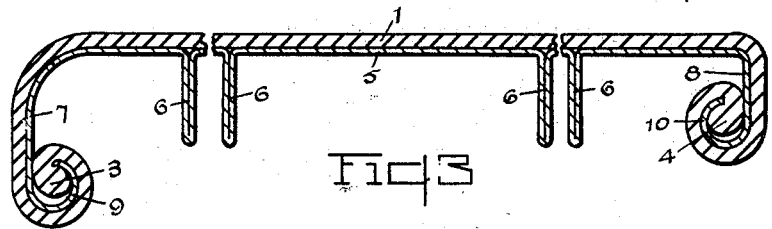
Figure 4:
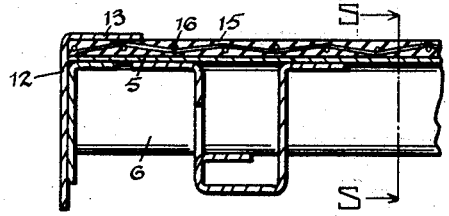
Figure 5:
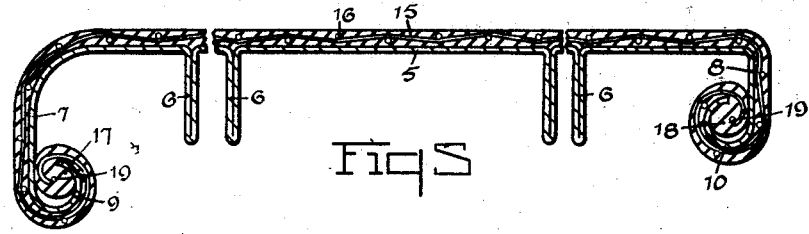

Fig. 1 illustrates a perspective view of the automobile tread. Fig. 2 is a view of a part of a longitudinal section of the tread and is taken along the plane of the line 2—2 as indicated in Fig. 1. Fig. 3 is a transverse section of the tread taken on the plane of the line 3—3 indicated in Fig. 2. Fig. 4 is a view of a section of a modified form of the tread. It is a view similar to the view shown in Fig. 2. Fig. 5 is a view of a transverse section taken on the plane of the line 5—5 indicated in Fig. 4.

The treads are formed of yieldable material, preferably rubber suitably vulcanized, that may be stretched over the surface of the running board. In the form of construction shown in Figs. 2 and 3, the sheet material 1, of elastic material, is secured along one edge of the running board 5 of the automobile 2, and is drawn over the surface of the running board and is then secured along the opposite edge. The edges of the sheet material are provided with beads 3 and 4. The running board 5 is formed of sheet metal having suitable reinforcing looped portions 6 extending longitudinal of the board, and downwardly extending flanges 7 and 8. The edge portions of the flanges 7 and 8 are curved inwardly as at 9 and 10. The bead 4 of the sheet material 1 is located in the curved portion 10 of the flange 8 and the curved portion is pressed towards the body of the flange 8 so as to enclose and fit about the bead 4. The sheet material is then drawn up over the flange 8 across the top of the running board 5, and down over the flange 7 and inserted within the curved portion 9 of the flange 7. The curved portion 9 is then further pressed towards the body of the flange 7 so as to tightly secure the bead 3 within the curved portion 9. The elastic material is thus tightly secured in position and forms a cushioning tread on the surface of the running board 5.

The ends of the cushioning material may be covered with a suitable L-shaped border 12 formed of sheet material. The border is provided with a flanged part 13 that extends over an end portion of the flexible sheet material 1, and a part 14 that may be spot welded or otherwise secured to the end of the running board 5.

In the form of construction shown in Figs. 4 and 5, the flexible sheet material 15 has embedded therein a light fabricated wire 16, having a relatively small mesh and expansible, within certain limitations, with the yieldable sheet material 15. The wire fabric 16 operates to maintain the moldable plastic material 15 intact and constitutes a reinforcement running throughout the entire body of the plastic material. The plastic material is molded about the wire mesh, the wire mesh being located substantially centrally with respect to the sheet material. The sheet material may be formed of rubber or any composition commonly used for covering floors and the wire mesh operates to prevent warping or cracking when it becomes hard by exposure. The side edges of the sheet material 15 are also provided with the beads 17 and 18 that are secured in the curved edge portions 9 and 10 of the flanges 7 and 8 in the same manner that the beaded edges of the sheet 1 are secured in the form of construction shown in Figs. 2 and 3. Preferably, the netted wire has rim wires 19 located in the beads 17 and 18 to securely lock the edges of the wire fabric in the inturned portions 9 and 10 of the running board. The wire fabric enables the tread to be stretched as in the form shown in Figs. 2 and 3. The end edges of the sheet 15 are also secured by the trim or border 12.

I claim:

1. A tread for an automobile running board, the board having a downwardly extending flange along its outer edge, the lower edge of the flange curved inwardly, a yieldable sheet material, means for securing the yieldable sheet material along its inner edge, the outer edge of the sheet material having a bead secured by the inturned curved portion of the flange of the running board.

2. A tread for a running board for automobiles, the running board having a pair of downwardly extending flanges, the lower edge portions of the flanges curved inwardly, a flexible sheet material covering the running board, and having beads extending along its side edges, the beads inclosed by the curved portions of the flanges for securing the sheet material in position.

In witness whereof I have hereunto signed my name to this specification.

GEORGE E. WHITLOCK.